Jan. 24, 1961   K. E. A. GÖTHBERG   2,969,267
CAGE FOR ROLLING BODIES IN ROLLING BEARINGS
Filed Oct. 18, 1957   2 Sheets-Sheet 1
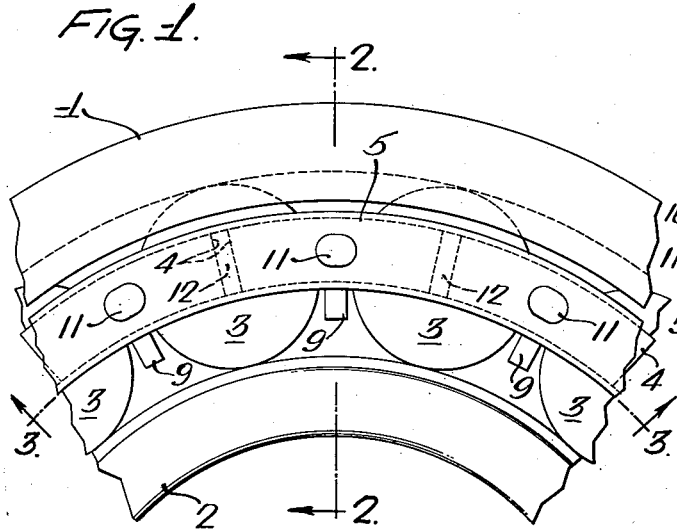
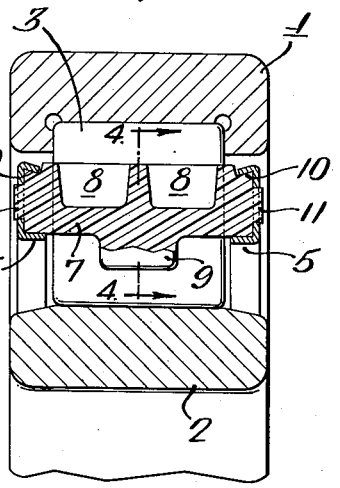
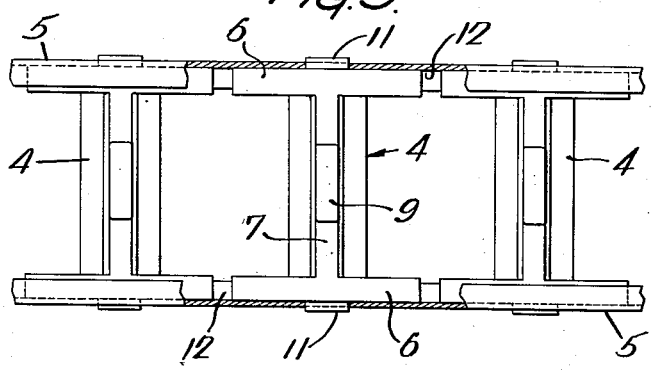
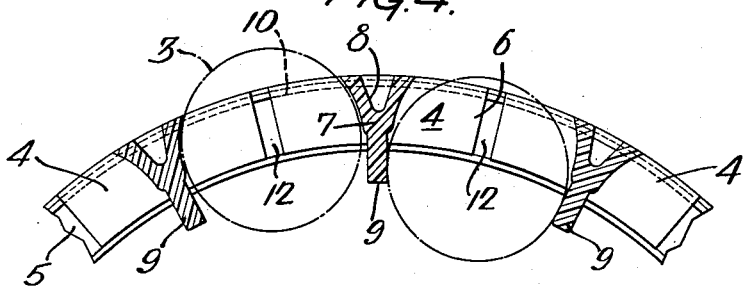
INVENTOR:
KARL EVALD ANDREAS GÖTHBERG
BY Howson & Howson
ATTYS.

Jan. 24, 1961  K. E. A. GÖTHBERG  2,969,267
CAGE FOR ROLLING BODIES IN ROLLING BEARINGS
Filed Oct. 18, 1957  2 Sheets-Sheet 2
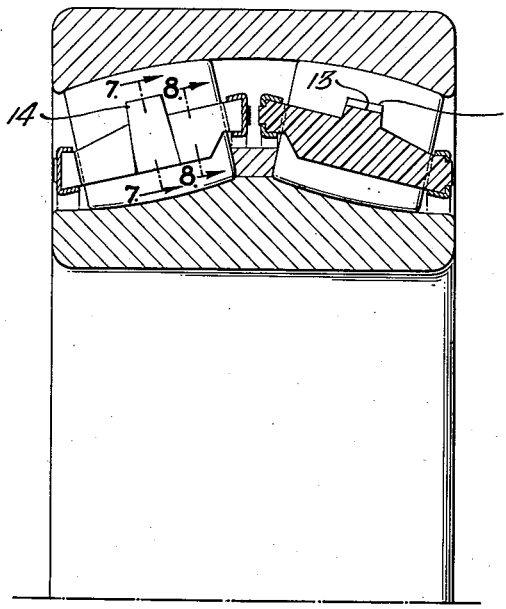
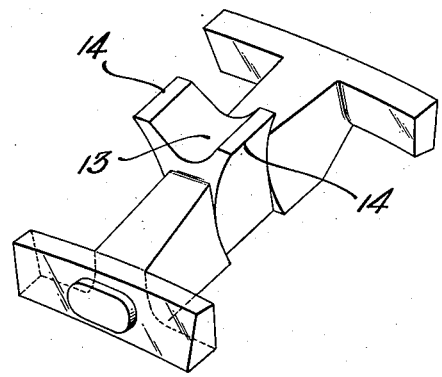
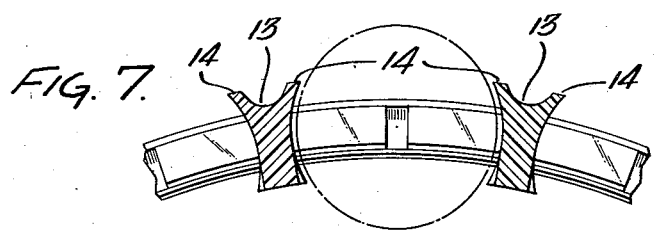
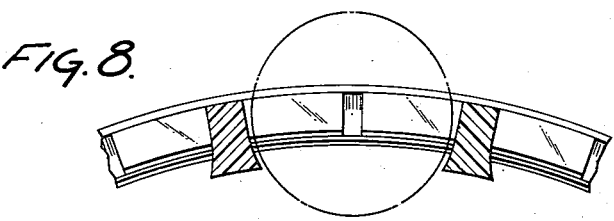
INVENTOR:
KARL EVALD ANDREAS GÖTHBERG
BY Howson & Howson
ATTYS.

United States Patent Office 2,969,267
Patented Jan. 24, 1961

2,969,267

CAGE FOR ROLLING BODIES IN ROLLING BEARINGS

Karl Evald Andreas Göthberg, Backasen, Lerum, Sweden, assignor to Aktiebolaget Svenska Kullagerfabriken, Goteborg, Sweden, a corporation of Sweden Filed Oct. 18, 1957, Ser. No. 690,994

Claims priority, application Sweden Oct. 23, 1956

11 Claims. (Cl. 308—217)

Certain plastics such as polyamides are particularly suitable for making cages for rolling bearings. These materials have a low specific weight, and the cage will therefore be light. The requirements as regards lubrication between the sliding surfaces of the cage and the rolling bodies are not so great as in ordinary metal cages, for which reason grease lubrication of the bearings can take place at longer intervals as compared to the latter type of cage. The frictional qualities of a plastic cage can be further improved, if a small quantity of molybdenum disulphide is mixed with the plastic. It is also possible to give a cage of plastic its final form by injecting the material in a molten condition into a suitable mould. This method of manufacture is cheap compared with the manufacture of a metal cage with the aid of cutting tools.

A certain disadvantage of the plastic material is its considerable expansion due to rise in temperature compared to the expansion of the steel in the rest of the rolling bearing. This is of less importance in small and medium-size bearings but is a disadvantage in larger sizes of bearings because of the considerable difference, caused by the greater thermal expansion of the cage, between the pitch diameter of the pockets in the annular cage and the pitch diameter of the set of rolling bodies as determined by the races. Further, in certain cases, the strength of the plastic may be insufficient for stresses to which the annular parts of the cage are subjected during running. The manufacture of a one-piece cage for the large sizes of bearings will also be comparatively expensive due to the fact that the mould for making a complete cage with separating fingers is expensive, and further because of the difficulty in forming large plastic bodies.

These disadvantages are avoided according to the present invention thereby, that the members forming the cage pockets comprise a plurality of plastic pocket forming members held together at each side by rings preferably of metal.

The invention is illustrated in the accompanying drawings, in which Fig. 1 is a fragmentary face view of a cylindrical roller bearing comprising a cage according to the invention. Fig. 2 is a sectional view on the line 2—2, Fig. 1. Fig. 3 shows a development of the cage from line 3—3, Fig. 1. Fig. 4 is a sectional view on the line 4—4, Fig. 2, showing a roller in the position which it assumes in the assembled bearing, and another roller in the position assumed by the rollers, when a set of rollers is being introduced into the outer ring of the bearing. Fig. 5 is a section through part of a double-row spherical roller bearing with a separate cage for each row of rollers. Fig. 6 is a view in perspective of a cage member, and Figs. 7 and 8 are sectional views along the lines 7—7 and 8—8 respectively in Fig. 5.

In the form of the invention shown in Figs. 1 to 4, the numeral 1 denotes the outer ring of the bearing and 2 the inner ring, between which are located rollers 3. In order to separate the rollers and retain them in the bearing when the inner ring of the bearing is removed, the bearing is provided with a roller cage consisting of a number of plastic cage elements 4 corresponding to the number of rollers. The elements 4, which may be made of a polyamide or other suitable plastic, are held together by metal rings 5 fixed to their sides. Each cage element consists of two divergent arcuate wings 6, connected through a cross-bar 7, which also separates the adjacent rollers. The cross-bars are hollowed out as at 8 to decrease their weight and the amount of material required. Each cross-bar is further provided with an inwardly directed tongue 9, extending over about the middle half of its length. The side faces of the cross-bar are suitably shaped to correspond to the curvature of the rollers, while the tongues 9 have plane side faces. The outer surfaces of the wings 6 are provided with grooves 10 for fixing the metal rings 5 mounted on each side of the cage elements. These rings have a substantially plain middle portion and an internal and an external flange, the rings thus being U-shaped in cross section. When assembling the cage, the outer cylindrical flange is rolled or turned down into the groove 10, thus connecting a number of elements to form a unit.

Each section is provided with round or oblong taps 11, arranged at the respective sides of the elements, preferably opposite the cross-bars 7. These taps are fitted into suitable holes in the rings 5, whereby the distance of the elements from each other will be determined with great accuracy independent of variations in temperature. A suitable space 12 is provided between two adjacent elements to enable them to expand considerably more than the rings upon being heated without coming into contact with each other. The metal rings, on the other hand, do not expand more than the outer parts of the bearing and can easily be manufactured with sufficient accuracy. The rings determine the positions of the plastic cross-bars and the whole accuracy and dimensional stability of the cage. Changes in dimensions of the plastic element will therefore not influence the accuracy of the complete cage.

As may be most easily seen from Fig. 3, each roller pocket is formed by the cross-bars of two adjacent cage elements. The rollers are introduced into the pockets by being forced past the tongues 9, which bend sufficiently to permit the rollers to pass between them. The cross-bars and the tongues should be sufficiently stiff, as compared to the weight of the rollers, to enable them to retain the rollers in the cage. The roller pockets are preferably so made as to permit the rollers to be displaced inwardly, as shown in the case of the right-hand roller in Fig. 4, sufficiently to enable the set of rollers to be introduced into the outer ring of the bearing through the side opening of the flange when assembling the bearing.

Figs. 5 to 8 show the invention applied to a two-row spherical roller bearing. In this case the basic shape of the cage is a cone. The tongues are directed outwardly, and the rollers are introduced into the pockets from the outside, whereby the tongues are displaced to permit the rollers to be inserted. To increase the resiliency of the tongue, each tongue is provided with a groove 13, thereby forming a pair of flexible lips 14. This form of cage can also be applied in principle to the taper roller bearings.

When the invention is applied to cylindrical roller bearings with flanges on the inner race ring, the cage may be made in principle in the same manner as the cage shown in Figs. 1 to 4 but with the tongues directed outwardly. The grooves 10 may be formed in the inner surfaces of the side-pieces or in both the inner and outer surfaces, and the corresponding flange is turned into the groove.

As is apparent from the figures, all surfaces which come into contact with the rollers are of plastic, whereby the metal rings never touch the rollers. The cage therefore has the advantages of a plastic cage, low friction and small weight, while at the same time having the strength and dimensional stability of a metal cage. The cage elements can be made with much cheaper tools than are required for manufacturing a complete plastic cage.

I claim:

1. A cage for the rolling bodies of rolling bearings, said cage being in the form of an annulus having pockets for said bodies, and consisting of a plurality of separated segmental pocket-defining elements of plastic, each of said elements comprising a pair of spaced divergent arcuate wings, a cross bar connecting said wings at the mid-sections thereof, means holding said elements together in said annulus, the said pockets being formed by the cross bars and wings of proximate elements of circumferentially adjoining pairs.

2. A cage according to claim 1, wherein the means for holding the plastic elements together comprises a ring at each axial side of the annulus, and means for interlocking the individual elements with the rings.

3. A cage according to claim 2, wherein the rings are composed of metal.

4. A cage according to claim 2, wherein the said interlocking means includes devices for anchoring the elements to the rings against relative movements circumferentially of the annulus.

5. A cage according to claim 4, wherein the said anchoring devices consist of projections at the axial ends of the elements and appertures in the rings for reception of said projections.

6. A cage according to claim 4, wherein the said interlocking means includes also flanges on the rings gripping the proximate sides of the said elements.

7. A cage according to claim 6, wherein the said proximate sides of the said elements are recessed to provide dovetail engagement between the said flanges and the elements to retain the rings against axial displacement from the elements.

8. A cage according to claim 1, wherein the said pockets lie between the proximate ends of the elements of the circumferentially adjoining pairs.

9. A cage according to claim 8, wherein the element-holding means includes devices for fixing the elements against relative movement circumferentially of the annulus.

10. A cage according to claim 8, wherein each of the elements comprises a pair of divergent arcuate wings forming wall portions of adjoining pockets, together with a cross bar joining the mid-sections of wings of the respective pairs.

11. A cage according to claim 8 wherein each of the elements comprises a pair of divergent arcuate wings forming wall portions of adjoining pockets together with circumferentially extended cross bars joining the respective ends of said wings.

References Cited in the file of this patent

UNITED STATES PATENTS

| | | |
|---|---|---|
| 1,183,650 | Knoth | May 16, 1916 |
| 1,996,841 | Stevens | Apr. 9, 1935 |
| 2,457,485 | Newton | Dec. 28, 1948 |
| 2,705,666 | Gibbons | Apr. 5, 1955 |

FOREIGN PATENTS

| | | |
|---|---|---|
| 993,520 | France | July 25, 1951 |